US009891497B2

(12) United States Patent
Yashiro et al.

(10) Patent No.: US 9,891,497 B2
(45) Date of Patent: Feb. 13, 2018

(54) ELECTROCHROMIC DEVICE AND METHOD FOR PRODUCING ELECTROCHROMIC DEVICE

(71) Applicants: Tohru Yashiro, Kanagawa (JP); Kohji Takeuchi, Kanagawa (JP); Sukchan Kim, Kanagawa (JP); Shun Goto, Kanagawa (JP); Yuuma Usui, Kanagawa (JP); Yasuo Katano, Kanagawa (JP); Satoshi Yamamoto, Kanagawa (JP); Daisuke Goto, Kanagawa (JP); Toshiya Sagisaka, Kanagawa (JP); Masato Shinoda, Kanagawa (JP); Mamiko Inoue, Tokyo (JP); Fuminari Kaneko, Kanagawa (JP); Hidekazu Yaginuma, Kanagawa (JP); Takahiko Matsumoto, Kanagawa (JP); Keiichiroh Yutani, Kanagawa (JP); Tamotsu Horiuchi, Shizuoko (JP); Hiroyuki Takahashi, Kanagawa (JP)

(72) Inventors: Tohru Yashiro, Kanagawa (JP); Kohji Takeuchi, Kanagawa (JP); Sukchan Kim, Kanagawa (JP); Shun Goto, Kanagawa (JP); Yuuma Usui, Kanagawa (JP); Yasuo Katano, Kanagawa (JP); Satoshi Yamamoto, Kanagawa (JP); Daisuke Goto, Kanagawa (JP); Toshiya Sagisaka, Kanagawa (JP); Masato Shinoda, Kanagawa (JP); Mamiko Inoue, Tokyo (JP); Fuminari Kaneko, Kanagawa (JP); Hidekazu Yaginuma, Kanagawa (JP); Takahiko Matsumoto, Kanagawa (JP); Keiichiroh Yutani, Kanagawa (JP); Tamotsu Horiuchi, Shizuoko (JP); Hiroyuki Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 68 days.

(21) Appl. No.: 15/190,681

(22) Filed: Jun. 23, 2016

(65) Prior Publication Data
US 2017/0010514 A1    Jan. 12, 2017

(30) Foreign Application Priority Data
Jul. 7, 2015   (JP) .................................. 2015-136264

(51) Int. Cl.
*G02F 1/153*    (2006.01)
*G02F 1/15*     (2006.01)
*G02F 1/155*    (2006.01)

(52) U.S. Cl.
CPC ............ *G02F 1/1533* (2013.01); *G02F 1/155* (2013.01); *G02F 1/1508* (2013.01); *G02F 2001/1515* (2013.01); *G02F 2001/1536* (2013.01)

(58) Field of Classification Search
CPC ....... G02F 1/1533; G02F 1/1508; G02F 1/155
(Continued)

(56) References Cited

U.S. PATENT DOCUMENTS 8,593,715 B2    11/2013  Yashiro et al.
8,687,262 B2    4/2014   Yashiro et al.
(Continued)

FOREIGN PATENT DOCUMENTS

JP    2014-112183    6/2014
JP    2015-096879    5/2015

*Primary Examiner* — Jack Dinh
(74) *Attorney, Agent, or Firm* — Cooper & Dunham LLP

(57) ABSTRACT

To provide an electrochromic device including: a support; a first electrode formed on the support; a second electrode facing the first electrode, where through-holes are formed in the second electrode; an electrochromic layer disposed in a
(Continued)

space between the first electrode and the second electrode; a first electrolyte layer disposed in the space between the first electrode and the second electrode; a second electrolyte layer disposed to communicate with the first electrolyte layer through the through-holes; an inorganic protective layer, which is disposed on a surface of the second electrolyte layer not facing the second electrode, and is configured to shield oxygen and water vapor; and an organic protective layer disposed on a surface of the inorganic protective layer that does not face the second electrolyte layer.

10 Claims, 3 Drawing Sheets

(58) Field of Classification Search
USPC .................................................. 359/265–275
See application file for complete search history.

(56) References Cited

U.S. PATENT DOCUMENTS

| | | |
|---|---|---|
| 8,743,048 B2 | 6/2014 | Takahashi et al. |
| 8,902,151 B2 | 12/2014 | Yashiro et al. |
| 8,937,758 B2 | 1/2015 | Kim et al. |
| 9,041,997 B2 | 5/2015 | Takahashi et al. |
| 9,069,222 B2 | 6/2015 | Naijo et al. |
| 2012/0050838 A1 | 3/2012 | Hirano et al. |
| 2013/0250394 A1 | 9/2013 | Okada et al. |
| 2013/0258439 A1 | 10/2013 | Naijo et al. |
| 2014/0212705 A1 | 7/2014 | Horiuchi et al. |
| 2015/0168796 A1 | 6/2015 | Yashiro et al. |
| 2015/0198857 A1 | 7/2015 | Yashiro et al. |
| 2015/0274761 A1 | 10/2015 | Sagisaka et al. |
| 2015/0279573 A1 | 10/2015 | Horiuchi et al. |
| 2015/0331295 A1 | 11/2015 | Takahashi et al. |
| 2016/0005375 A1 | 1/2016 | Naijo et al. |

ELECTROCHROMIC DEVICE AND METHOD FOR PRODUCING ELECTROCHROMIC DEVICE

CROSS-REFERENCE TO RELATED APPLICATIONS

The present application claims priority under 35 U.S.C. §119 to Japanese Patent Application No. 2015-136264, filed Jul. 7, 2015. The contents of which are incorporated herein by reference in their entirety.

BACKGROUND OF THE INVENTION

Field of the Invention

The present disclosure relates to electrochromic devices and methods for producing electrochromic devices.

Description of the Related Art

Electrochromism is a phenomenon where an oxidation-reduction reaction is caused to reversibly change a color by applying voltage. An electrochromic device utilizing the electrochromism has been intensively studied to realize applications derived from electrochromism.

The electrochromic device is typically produced by forming a layer containing an electrochromic material on one of two plate-shaped electrodes, followed by bonding the two electrodes together to sandwich the formed layer containing an electrochromic material and an electrolyte layer capable of conducting ions. In the production of the electrochromic device, a liquid electrolyte (an electrolyte solution) is used for the electrolyte layer to achieve a fast response of the device.

If an electrochromic device can be produced by a method that does not carry out the aforementioned bonding process, a device can be formed on various sites, such as a curved surface. Therefore, a wide range of applications can be realized, and a low-cost production can be achieved because a support is not required at one side of the device. Accordingly, production methods without a bonding process have been proposed.

However, the support was disposed on only one side of the device, and thus such production methods had a problem that electric resistance of the electrode was high when a transparent oxide electrode was directly formed on the electrolyte layer. Moreover, it was difficult to completely seal the electrolyte solution in the device, and problems, such as leakage of the electrolyte solution, tended to occur. If the electrolyte solution was replaced with a solid electrolyte to solve the aforementioned problems, electric conductivity was low, and there was a problem that desired coloring decoloring properties could not be obtained.

In order to solve the aforementioned problems, the present inventors have proposed, in Japanese Unexamined Patent Application Publication No. 2014-112183, an electrochromic device in which a first electrode, an electrochromic layer, an insulating porous layer, a second electrode with through-holes, and an antideterioration layer are sequentially formed on a support, followed by filling a space between the electrodes with the electrolyte solution from the through-holes of the second electrode and solidifying the electrolyte solution to form an electrolyte layer, an electrolyte layer is also formed on the second electrode, and an organic protective layer is formed on the electrolyte layer formed on the second electrode.

SUMMARY OF THE INVENTION

An electrochromic device of the present disclosure includes a support, a first electrode formed on the support, a second electrode facing the first electrode where through-holes are formed in the second electrode, an electrochromic layer disposed in a space between the first electrode and the second electrode, a first electrolyte layer disposed in the space between the first electrode and the second electrode, a second electrolyte layer disposed to communicate with the first electrolyte layer through the through-holes, an inorganic protective layer, which is disposed on a surface of the second electrolyte layer not facing the second electrode, and is configured to shield oxygen and water vapor, and an organic protective layer disposed on a surface of the inorganic protective layer not facing the second electrolyte layer.

DESCRIPTION OF THE EMBODIMENTS

Electrochromic Device

Figure 1:
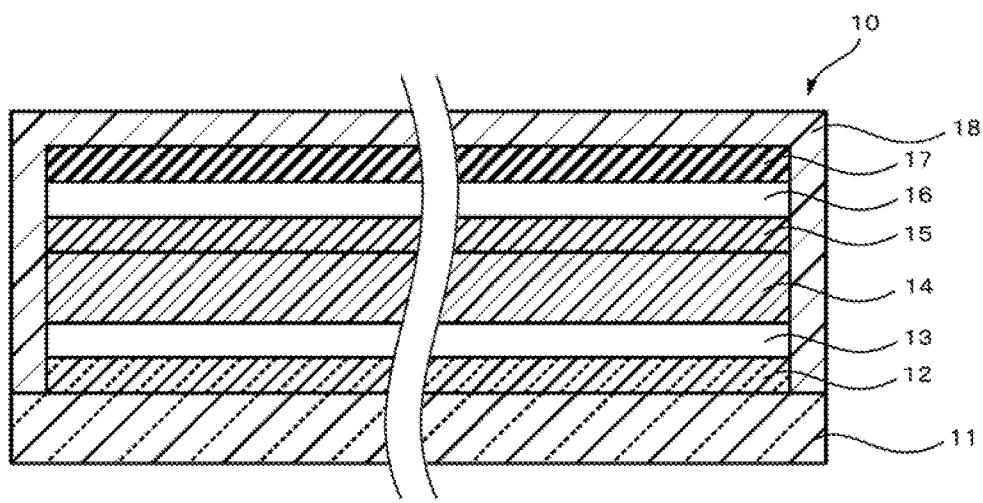
FIG. 1 is a schematic cross-sectional view illustrating one example of an electrochromic device of a first embodiment.

An electrochromic device of the present disclosure includes a support, a first electrode, a second electrode, an electrochromic layer, a first electrolyte layer, a second electrolyte layer, an inorganic protective layer, and an organic protective layer. The electrochromic device may further include other layers, such as an antideterioration layer, if necessary.

The present disclosure has an object to provide an electrochromic device, which can be easily produced without a bonding process, can maintain oxygen shielding properties and water-vapor shielding properties with an element structure including only one support, and has improved durability.

The present disclosure can provide an electrochromic device, which can be easily produced without a bonding process, can maintain oxygen shielding properties and water-vapor shielding properties with an element structure including only one support, and has improved durability.

The electrochromic device of the present disclosure has been accomplished based on the finding that the electrochromic device disclosed in Japanese Unexamined Patent Application Publication No. 2014-112183 reduces durability, because it is difficult to for a hydrophilic electrolyte layer and an organic protective layer formed of a hydrophobic organic material to closely adhere to each other, and water vapor or oxygen tends to enter from a peeled area of the device formed over time. The electrochromic device of the present disclosure is also based on the following finding. If an attempt is made to make the organic protective layer and the electrolyte layer compatible to each other (i.e., the organic protective layer dissolves a surface of the electrolyte layer) to prevent peeling, electric conductivity of the electrolyte layer decreases to lower coloring decoloring properties, and also lower a water vapor barrier effect of the organic protective layer.

Examples of a layer structure of the electrochromic device include a first embodiment through a fifth embodiment described below.

The electrochromic device of the first embodiment has a layer structure including the support in a shape of a plate, and the first electrode, the electrochromic layer, the first electrolyte layer, the second electrode, the second electrolyte layer, the inorganic protective layer, and the organic protective layer sequentially laminated over the support.

The electrochromic device of the second embodiment has a layer structure including the support, and the first electrode, an electrochromic-material-containing electrolyte layer, the second electrode, the second electrolyte layer, the inorganic protective layer, and the organic protective layer sequentially laminated over the support.

Comparing the electrochromic device of the second embodiment with the electrochromic device of the first embodiment, the electrochromic device of the second embodiment is different from that of the first embodiment in that the electrochromic-material-containing electrolyte layer, in which the electrochromic layer is integrated with the first electrolyte layer, is formed.

The electrochromic device of the third embodiment has a layer structure including the support, and the first electrode, the electrochromic layer, the first electrolyte layer, the antideterioration layer, the second electrode, the second electrolyte layer, the inorganic protective layer, and the organic protective layer sequentially laminated over the support.

Comparing the electrochromic device of the third embodiment with the electrochromic device of the first embodiment, the electrochromic device of the third embodiment is different from that of the first embodiment in that the antideterioration layer is formed between the first electrolyte layer and the second electrode.

The electrochromic device of the fourth embodiment has a layer structure including the support, and the first electrode, the electrochromic layer, the first electrolyte layer, the second electrode, the antideterioration layer, the second electrolyte layer, the inorganic protective layer, and the organic protective layer sequentially laminated over the support.

Comparing the electrochromic device of the fourth embodiment with the electrochromic device of the first embodiment, the electrochromic device of the fourth embodiment is different from that of the first embodiment in that the antideterioration layer is formed between the second electrode and the second electrolyte layer.

Comparing the electrochromic device of the fifth embodiment with the electrochromic device of the fourth embodiment, the electrochromic device of the fifth embodiment is different from that of the fourth embodiment in that the plate-shaped support is replaced with an optical lens.

Effects obtainable by the layer structure of each embodiment is described below with reference to drawings.

<Support>

The support is not particularly limited and may be appropriately selected depending on the intended purpose. The support is preferably a support that can support the first electrode, the second electrode, the electrochromic layer, the first electrolyte layer, the second electrolyte layer, the inorganic protective layer, and the aforementioned other layers.

A material of the support is not particularly limited and may be appropriately selected depending on the intended purpose. Examples of the material include inorganic materials and organic materials.

Examples of the inorganic materials include glass substrates and metal substrates. Examples of the glass substrates include non-alkali glass, borosilicate glass, float glass, and soda-line glass. Examples of the metal substrates include aluminium, stainless steel, and titanium.

Examples of the organic materials include resin substrates. Examples of the resin substrates include polycarbonate resins, acrylic resins, polyethylene, polyvinyl chloride, polyester, epoxy resins, melamine resins, phenol resins, polyurethane resins, and polyimide resins.

When the electrochromic device is used as a reflective display device that is viewed from a side of the second electrode, transparency of the support is not necessary.

In a case where a conductive metal material is used as the support, the support may also function as the first electrode.

Moreover, a surface of the support not facing the first electrode may be coated with other layers, such as a transparent insulating layer and an antireflection layer, in order to enhance water-vapor shielding properties, gas barrier properties, and visibility.

<First Electrode>

The first electrode is not particularly limited and may be appropriately selected depending on the intended purpose, as long as the first electrode is formed on the support.

A material of the first electrode is not particularly limited and may be appropriately selected depending on the intended purpose. In a case where a resultant electrochromic device is used as dimming glass, the material is preferably a conductive transparent material that is transparent and has excellent conductivity, because transparency to light is obtained and a contrast between coloring and decoloring can be enhanced.

The conductive transparent material is not particularly limited and may be appropriately selected depending on the intended purpose. Examples of the conductive transparent materials include inorganic materials, such as tin-doped indium oxide (hereinafter may be referred to as "ITO"), fluorine-doped tin oxide (hereinafter may be referred to as "FTO"), antimony-doped tin oxide (hereinafter may be referred to as "ATO"), indium oxide formed by vapor film formation (hereinafter may be referred to as "In oxide"), tin oxide (hereinafter may be referred to as "Sn oxide"), and zinc oxide (hereinafter may be referred to as "Zn oxide").

Among the above-listed materials, an inorganic material containing at least one selected from the group consisting of In oxide, Sn oxide, and Zn oxide is preferable, and InSnO, GaZnO, SnO, $In_2O_3$, and ZnO are more preferable. When the conductive transparent material is the inorganic material containing at least one selected from the group consisting of the In oxide, the Sn oxide, and the Zn oxide, a film of the conductive transparent material can be easily formed because sputtering can be used for the formation of the film, and excellent transparency and electric conductivity of the resultant film can be obtained.

A network electrode of transparent silver, gold, carbon nanotubes, or metal oxide, or a composite layer of the aforementioned materials may be used as the conductive transparent material. Note that, the network electrode is an electrode, in which carbon nanotubes or another highly-conductive non-transparent material is formed into a network to make the electrode transparent.

An average thickness of the first electrode is not particularly limited and may be appropriately selected depending on the intended purpose, but the average thickness is preferably adjusted to obtain an electric resistance value required for an oxidation-reduction reaction of the electrochromic layer. When ITO is used as a material of the first electrode, an average thickness of the first electrode is preferably 50 nm or greater but 500 nm or less.

<Second Electrode>

The second electrode is not particularly limited and may be appropriately selected depending on the intended purpose, as long as the second electrode faces the first electrode, and through-holes are formed in the second electrode.

Compared with the first electrode, the second electrode is identical to the first electrode, except that the through-holes are formed in the second electrode along the thickness direction. As a material of the second electrode, an identical material to that of the first electrode can be used.

<<Through-Holes>>

The through-holes are not particularly limited and may be appropriately selected depending on the intended purpose. The through-holes are preferably a large number of fine through-holes.

Diameters of the through-holes are not particularly limited and may be appropriately selected depending on the intended purpose. The diameters are preferably 10 nm (0.01 μm) or greater but 100 μm or smaller. When the diameters of the through-holes are within the preferable range, advantageously, it is possible to reduce problems with a reduction in permeation of electrolyte ions, and also to reduce problems at such a level that is visually recognizable at portions directly above the through-holes (a size of a level of a 1 pixel electrode in a typical display).

A pore area rate (pore density) of the through-holes formed in the second electrode relative to a surface area of the second electrode is not particularly limited and may be appropriately selected depending on the intended purpose. The pore area rate is preferably from 0.01% through 40%. When the pore area rate is within the preferable range, permeability of electrolyte ions is excellent, a problem in coloring decoloring operations hardly occurs, a surface resistance of the second electrode is prevented from being excessively large, and occurrences of chromic defects due to a widened area of a region where the second electrode is not present are prevented.

In a case where the electrochromic device is used as a dimming mirror, either the first electrode or the second electrode preferably has a reflection function.

In this case, a metal material is preferably contained as a material of the first electrode and the second electrode.

Examples of the metal material include metals (e.g., Pt, Ag, Au, Cr, and rhodium), alloys of the metals, and laminated products of at least one of the metals and the alloys.

<Electrochromic Layer>

The electrochromic layer includes an electrochromic material, and may further include other ingredients, if necessary.

The electrochromic layer is not particularly limited and may be appropriately selected depending on the intended purpose, as long as the electrochromic layer is disposed in a space between the first electrode and the second electrode.

Note that, the electrochromic layer may be separated from the first electrolyte layer as a separate layer, or may be integrated with the first electrolyte layer.

<<Electrochromic Material>>

The electrochromic material is not particularly limited and may be appropriately selected depending on the intended purpose. Examples of the electrochromic material include inorganic electrochromic compounds, organic electrochromic compounds, and conductive polymers known to exhibit electrochromism.

Examples of the inorganic electrochromic compounds include electrochromic compounds, such as metal complexes and metal oxides. Specific examples of the inorganic electrochromic compounds include titanium oxide, vanadium oxide, tungsten oxide, indium oxide, iridium oxide, nickel oxide, and Prussian blue.

Examples of the organic electrochromic compounds include viologen, rare-earth phthalocyanine, and styryl. When the organic electrochromic compound is contained as the electrochromic material, an electrochromic device having excellent color properties can be realized.

Examples of the conductive polymer compounds include polythiophene and polyaniline.

As polymer-based electrochromic compounds and dye-based electrochromic compounds, specific examples of the conductive polymer compounds include low-molecular-weight organic electrochromic compounds (e.g., azobenzene compounds, anthraquinone compounds, diarylethene compounds, dihydroprene compounds, dipyridine compounds, styryl compounds, styrylspiropyran compounds, spirooxadine compounds, spirothiopyran compounds, thioindigo compounds, tetrathiafulvalene compounds, terephthalic acid compounds, triphenylmethane compounds, triphenylamine compounds, naphthopyran compounds, viologen compounds, pyrazoline compounds, phenazine compounds, phenylenediamine compounds, phenoxazine compounds, phenothiazine compounds, phthalocyanine compounds, fluoran compounds, fulgide compounds, benzopyran compounds, and metallocene compounds), and conductive polymer compounds (e.g., polyaniline and polythiophene). These compounds may be used alone or in combination.

Among the above-listed compounds, viologen compounds and dipyridine compounds are preferable, and dipyridine compounds represented by the following general formula (1) are more preferable, in view of excellent color values thereof.

<General formula (1)>

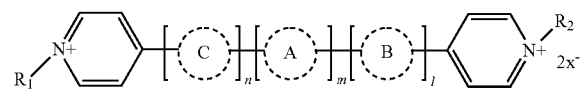

In the general formula (1), R1 and R2 are each independently an alkyl group having from 1 through 8 carbon atoms or an aryl group, both of which may have a substituent. At least one of R1 and R2 has a substituent selected from the group consisting of —COOH, —PO(OH)$_2$, and —Si(OC$_k$H$_{2k+1}$)$_3$.

Note that, k is an integer of from 1 through 20, X$^-$ is a monovalent anion, n, m, and l are each 0, 1, or 2, and A, B, and C are each independently an alkyl group having from 1 through 20 carbon atoms, an aryl group, or a heterocyclic group, all of which may have a substituent.

The monovalent anion X$^-$ is not particularly limited and may be appropriately selected depending on the intended purpose, as long as the monovalent anion X$^-$ stably forms a pair with a cation site. Examples of the monovalent anion X$^-$ include Br ion (Br$^-$), Cl ion (Cl$^-$), ClO$_4$ ion (ClO$_{4-}$), PF$_6$ ion (PF$_6{}^-$), and BF$_4$ ion (BF$_4{}^-$).

The polymer-based electrochromic material is preferably a radical polymerizable compound having a triarylamine structure. When the electrochromic layer is formed by polymerizing the radical polymerizable compound having a triarylamine structure, repeating operation (oxidation-reduction reactions) properties of the resultant electrochromic device are excellent, and light resistance of the electrochromic device can be improved. In addition, the resultant electrochromic device in a decolored state is transparent, and coloring of the electrochromic device with a high density can be obtained by an oxidation reaction. When the electrochromic layer includes a crosslinked product obtained by crosslinking an electrochromic compound (composition) containing the radical polymerizable compound having a triarylamine structure and another radical polymerizable compound different from the radical polymerizable compound having a triarylamine structure, the electrochromic layer is preferable because dissolution resistance and durability of the polymerized product are further improved.

—Radical Polymerizable Compound Having Triarylamine Structure—

The radical polymerizable compound having a triarylamine structure imparts an electrochromic function having oxidation-reduction reactions to a surface of the first electrode.

Examples of the radical polymerizable compound having a triarylamine structure include compounds represented by the following general formula (2).

$$A_n\text{-}B_m \qquad \text{<General formula (2)>}$$

When n is 2 (n=2), m is 0. When n is 1 (n=1), m is 0 or 1. At least one of A and B has a radical polymerizable functional group. The A is a structure represented by the following general formula (3), and is bonded to the B at any of the sites from $R_1$ through $R_{15}$. The B is a structure represented by the following general formula (4), and is bonded to the B at any of the sites from $R_{16}$ through $R_{21}$.

<General formula (3)>

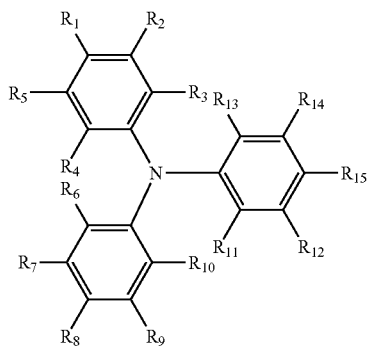

<General formula (4)>

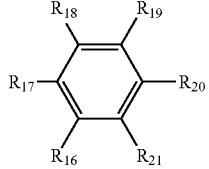

In the general formulae (3) and (4), $R_1$ through $R_{21}$ are monovalent organic groups that may be identical or different. At least one of the monovalent organic groups is a radical polymerizable functional group.

The electrochromic layer preferably has a structure where the organic electrochromic compound is born on at least one of conductive particles and semiconductive particles.

The conductive particles and the semiconductive particles are not particularly limited and may be appropriately selected depending on the intended purpose. The conductive particles and the semiconductive particles are preferably metal oxide particles.

Examples of the metal oxide include metal oxides containing titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, indium oxide, tungsten oxide, iron oxide, copper oxide, nickel oxide, cobalt oxide, barium oxide, strontium oxide, vanadium oxide, aminosilicic acid, calcium phosphate, or aminosilicate as a main component. These metal oxides may be used alone or in combination.

Among the above-listed examples, at least one or a mixture selected from the group consisting of titanium oxide, zinc oxide, tin oxide, zirconium oxide, magnesium oxide, indium oxide, tungsten oxide, and iron oxide is preferable because a color display having an excellent response speed of coloring and decoloring can be realized. Moreover, titanium oxide is more preferable because a color display having an excellent response speed of coloring and decoloring can be surely realized.

Shapes of the conductive particles and the semiconductive particles are not particularly limited. In order to efficiently bear an electrochromic compound, the shapes are preferably shapes having a large surface area per unit volume (hereinafter may be referred to as a "specific surface area"). In a case where the conductive particles and the semiconductive particles are aggregates of nanoparticles, for example, the conductive particles and the semiconductive particles have large specific surface areas. Therefore, an electrochromic compound is more efficiently born on the conductive particles or the semiconductive particles to thereby realize an excellent display contrast ratio of coloring and decoloring.

An average thickness of the electrochromic layer is not particularly limited and may be appropriately selected depending on the intended purpose. The average thickness is preferably 0.2 µm or greater but 5.0 µm or less. When the average thickness of the electrochromic layer is within the preferable range, a desired coloring density is easily obtained, a production cost is reduced, and occurrences of reduced visibility due to tinting are prevented.

<First Electrolyte Layer>

The first electrolyte layer is not particularly limited and may be appropriately selected depending on the intended purpose, as long as the first electrolyte layer is disposed in a space between the first electrode and the second electrode.

The first electrolyte layer includes an insulating porous layer and an electrolyte solution, and may further include other ingredients, if necessary. The first electrolyte layer is formed by solidifying the electrolyte solution.

Note that, the first electrolyte layer may be separated from the electrochromic layer as a separate layer, or may be integrated with the electrochromic layer.

<<Insulating Porous Layer>>

The insulating porous layer separates the first electrode from the second electrode to achieve electrical insulation between the first electrode and the second electrode, and has a function of retaining an electrolyte contained in the electrolyte solution to be introduced.

The insulating porous layer is not particularly limited and may be appropriately selected depending on the intended purpose, but the insulating porous layer preferably contains insulating metal oxide particles.

—Insulating Metal Oxide Particles—

Examples of the metal oxide particles include $SiO_2$ particles and $Al_2O_3$ particles. Among the above-listed examples, $SiO_2$ particles are preferable. Use of $SiO_2$ particles as the insulating metal oxide particles is preferable because nanoparticles whose number average particle diameter of primary particles is 5 nm or greater but 500 nm or smaller, and a dispersion coating liquid of the nanoparticles can be obtained at low cost.

Examples of the insulating porous layer include a polymerized particle film containing the metal oxide particles and a polymer binder, a porous organic film, and an inorganic insulating material film formed into a porous film.

Examples of the porous organic film include polyurethane resins, and polyethylene resins.

A material of the insulating porous layer is not particularly limited and may be appropriately selected depending on the intended purpose. The material of the insulating porous layer is preferably an organic material, an inorganic material, or a composite of the organic material and the inorganic material, all of which have high insulating properties and durability and excellent film formability.

An average thickness of the insulating porous layer is not particularly limited and may be appropriately selected depending on the intended purpose. The average thickness of the insulating porous layer is preferably 50 nm or greater but 10 µm or less.

An average roughness (Ra) of the insulating porous layer depends on an average thickness of the second electrode. When the average thickness of the second electrode is 100 nm, for example, the average roughness of the insulating porous layer needs to be less than 100 nm. When the average roughness is 100 nm or less, a surface resistance of the second electrode is not largely reduced, and the roughness does not tend to cause display defects.

The insulating porous layer preferably includes an inorganic film. When the insulating porous layer includes the inorganic film, it is possible to reduce damages applied on organic materials of underlying layers, such as the insulating porous layer and the electrochromic layer, during formation of the second electrode on a surface of the insulating porous layer through sputtering.

A material of the inorganic film is not particularly limited and may be appropriately selected depending on the intended purpose. For example, the material of the inorganic film is preferably an insulating transparent material, such as $SiO_2$ and $Al_2O_3$, and more preferably an insulating transparent material containing ZnS, such as $ZnS—SiO_2$, ZnS—SiC, ZnS—Si, and ZnS—Ge. When the ZnS is contained in the insulating transparent material, such as $SiO_2$ and $Al_2O_3$, a film can be formed at high speed by sputtering without causing a damage to the electrochromic layer.

The ZnS content is not particularly limited and may be appropriately selected depending on the intended purpose. The ZnS content is preferably 50 mol % or greater but 90 mol % or less. When the ZnS content is within the preferable range, crystallinity of the inorganic film at the time when the insulating porous layer is formed can be maintained excellently.

Moreover, the electrochromic device can be produced as a reflection display device by forming the insulating porous layer as a white layer. In this case, the insulating porous layer is a layer in which white pigment particles are further added to the insulating porous layer, and the insulating porous layer functions as a white reflective layer.

Examples of a material of the white pigment particles include titanium oxide, aluminium oxide, zinc oxide, silica, cesium oxide, and yttrium oxide.

Among the above-listed materials, $ZnS—SiO_2$ (8/2, mass ratio), $ZnS—SiO_2$ (7/3, mass ratio), ZnS, and $ZnS—ZnO—In_2O_3—Ga_2O_3$ (60/23/10/7, mass ratio) are preferable. When the aforementioned material is used as the insulating porous layer, an excellent insulating effect can be obtained with a small average thickness, and a reduction in a strength of a layer and peeling of the layer can be prevented.

<<Electrolyte Solution>>

The electrolyte solution includes an electrolyte and a solvent, and may further include other ingredients, if necessary.

The electrolyte solution is introduced into the insulating porous layer disposed on a surface of the second electrode facing the first electrode through the through-holes formed in the second electrode, and is introduced onto a surface of the second electrode not facing the first electrode through the through-holes, to thereby form the electrolyte layers. Specifically, the electrolyte solution is introduced between the first electrode and the second electrode, and is in contact with the electrochromic layer. Moreover, the electrolyte solution is not brought into contact with the organic protective layer because the inorganic protective layer is formed on the second electrolyte layer that is formed on a surface of the second electrode not facing the first electrode.

In a case where the antideterioration layer is formed as in the third through fifth embodiments, the electrolyte solution is introduced into the insulating porous layer and onto a surface of the second electrode not facing the first electrode through the through-holes via the antideterioration layer. The electrolyte solution is disposed through the through-holes formed in the second electrode to be in contact with the antideterioration layer.

—Electrolyte—

The electrolyte is not particularly limited and may be appropriately selected depending on the intended purpose. The electrolyte preferably contains inorganic material particles. When the second electrolyte layer is formed with the electrolyte, it is advantageous to add the inorganic materials in the electrolyte because a resistance to a process for forming the inorganic protective layer can be assured. Moreover, a solvent may be added to the electrolyte to enhance ion conductivity.

Examples of a material of the electrolyte include inorganic ion salts (e.g., alkali metal salts and alkaline earth metal salts), quaternary ammonium salts, and supporting electrolytes (e.g., acids and bases). Specific examples of the material include $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$. These materials may be used alone or in combination.

—Solvent—

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, and alcohols. These solvents may be used alone or in combination.

Moreover, an ionic liquid can be used as the electrolyte solution.

The ionic liquid is not particularly limited and may be appropriately selected from ones known in the art depending on the intended purpose. The ionic liquid is preferably an organic ionic liquid. Use of the organic ionic liquid is advantageous because the organic ionic liquid has a molecular structure which is present as a liquid in a wide temperature range including room temperature.

Examples of a cationic component of the molecular structure include aromatic salts (e.g., imidazole derivatives and pyridinium derivatives) and aliphatic quaternary ammonium-based compounds.

Examples of the imidazole derivatives include N,N-dimethylimidazole salts, N,N-methylethylimidazole salts, and N,N-methylpropylimidazole salts.

Examples of the aromatic salts, such as the pyridinium derivatives include N,N-dimethylpyridinium salts and N,N-methylpropylpyridinium salts.

Examples of the aliphatic quaternary ammonium-based compounds include tetraalkyl ammonium, such as trimethylpropyl ammonium salts, trimethylhexyl ammonium salts, and triethylhexyl ammonium salts.

An anionic component of the molecular structure is preferably a compound containing fluorine in view of stability in the atmosphere.

Examples of the anionic component include $BF_4^-$, $CF_3SO_3^-$, $PF_4^-$, and $(CF_3SO_2)_2N^-$.

The ionic liquid prepared by formulating the aforementioned cationic component and anionic component can be used.

—Other Ingredients—

The aforementioned other ingredients are not particularly limited and may be appropriately selected depending on the intended purpose. As the other ingredients, inorganic material particles are preferable.

—Inorganic Material Particles—

The inorganic material particles are not particularly limited and may be appropriately selected depending on the intended purpose. The inorganic material particles are preferably nanoparticles or composites of the nanoparticles, both of which can improve a film strength of the electrolyte layer when dispersed in the electrolyte layer, and have high insulating properties, high durability, and excellent film formability. When high transparency is required, such as a case where the electrochromic device is used as dimming glass, metal oxide is particularly preferably used as the inorganic material particles.

Specific examples of the material include metal oxides having silicon oxide, aluminium oxide, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aminosilicic acid, calcium phosphate, or aminosilicate as a main component. These metal oxides may be used alone or in combination.

Among the above-listed examples, silicon oxide and aluminium oxide are preferable in view of insulating properties and a cost.

A number average particle diameter of primary particles of the inorganic material particles is preferably as small as possible, and is preferably 2 nm or greater but 20 μm or smaller.

Figure 2:
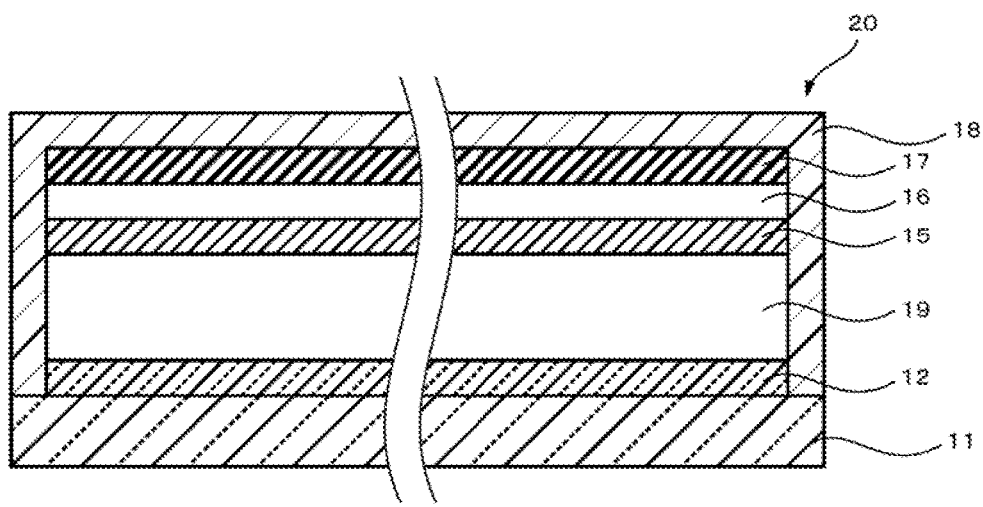
FIG. 2 is a schematic cross-sectional view illustrating one example of an electrochromic device of a second embodiment.

In case of a structure where the electrochromic material is dissolved or made compatible with the first electrolyte layer and the second electrolyte layer, as illustrated in FIG. 2, the electrochromic material formed of an organic material can be used in a state of being mixed with the solvent and the electrolyte, or a curable resin monomer, without forming the electrochromic layer.

<Second Electrolyte Layer>

The second electrolyte layer is not particularly limited and may be appropriately selected depending on the intended purpose, as long as the second electrolyte layer is disposed in a manner that the second electrolyte layer can be communicated with the first electrolyte layer through the through-holes.

The second electrolyte layer is a layer prepared by solidifying the electrolyte solution on a surface of the second electrode, when the electrolyte solution is introduced into the insulating porous layer of the first electrolyte layer through the through-holes formed in the second electrode.

<Inorganic Protective Layer>

The inorganic protective layer is not particularly limited and may be appropriately selected depending on the intended purpose, as long as the inorganic protective layer contains an inorganic material, is disposed on a surface of the second electrolyte layer not facing the second electrode, and is configured to shield oxygen and water vapor. The inorganic protective layer is a layer, at least a surface of which facing the organic protective layer is formed of an inorganic material. When at least a surface of the inorganic protective layer facing the organic protective layer is formed of an inorganic material, it is advantageous because oxygen shielding properties and water-vapor shielding properties can be obtained.

—Inorganic Material—

The inorganic material is not particularly limited and may be appropriately selected depending on the intended purpose. Examples of the inorganic material include silicon oxide, aluminium oxide, silicon nitride, and aluminium nitride. The inorganic material is preferably a material having excellent insulating properties and transparency.

A structure of the inorganic material is not particularly limited and may be appropriately selected depending on the intended purpose. The structure of the inorganic material is preferably dense in order to assure a shielding capability against water vapor and oxygen.

In a case where the electrochromic device is a dimming device, a material of the inorganic protective layer is preferably transparent.

—Water-Vapor Shielding Properties—

The water-vapor shielding properties are preferably 0.0001 $g/m^2/day$ or greater but 1 $g/m^2/day$ or less, and more preferably 0.0001 $g/m^2/day$ or greater but 0.01 $g/m^2/day$ or less. When the water-vapor shielding properties are within the aforementioned preferable range, a barrier function that ions of the second electrolyte layer are prevented from being adversely affected by environmental conditions (e.g., water vapor) can be obtained.

For example, the water-vapor shielding properties can be measured by means of a water vapor permeation rate measuring device (AQUATRAN, available from MOCON, Inc.).

An average thickness of the inorganic protective layer is not particularly limited and may be appropriately selected depending on the intended purpose. The average thickness of the inorganic protective layer is preferably 100 nm or greater but 2 μm or less.

<Organic Protective Layer>

The organic protective layer is not particularly limited and may be appropriately selected depending on the intended purpose, as long as the organic protective layer contains an organic material, and is disposed on a surface of the inorganic protective layer not facing the second electrolyte layer.

Examples of the organic material include insulating resins having curability, such as UV curability and thermal curability.

The organic protective layer is formed by applying a coating liquid of the organic protective layer to cover side surfaces of each layer formed on the support and a top surface of the inorganic protective layer, followed by curing the coating liquid.

The electrochromic device can be protected from scratches and electric disorders, because the organic protective layer is formed. Moreover, leakage of electrolyte ions of the first electrolyte layer and the second electrolyte layer can be prevented, and durability of the electrochromic device can be improved, because the organic protective layer is formed.

An average thickness of the organic protective layer is not particularly limited and may be appropriately selected depending on the intended purpose. The average thickness of the organic protective layer is preferably 0.5 μm or greater but 20 μm or less.

Note that, a UV-ray cut function or antistatic function is preferably further imparted to a surface of the organic protective layer.

<Other Layers>

The aforementioned other layers are not particularly limited and may be appropriately selected depending on the intended purpose. The electrochromic device preferably includes an antideterioration layer as the aforementioned other layers.

<<Antideterioration Layer>>

A role of the antideterioration layer is to prevent corrosion or deterioration of the first electrode and the second electrode caused by irreversible oxidation-reduction reactions, and improve repeating stability by carrying a chemical reaction reverse to a chemical reaction performed in the electrochromic layer to balance charges. Note that, the reverse chemical reaction includes a case where the antideterioration layer functions as a capacitor as well as a case where the antideterioration layer performs oxidation or reduction.

Moreover, the antideterioration layer is preferably composed of a porous thin film or permeable thin film, which does not inhibit introduction of the electrolyte solution into the insulating porous layer. Specifically, the antideterioration is a porous thin film, which is prepared by securing at least one of conductive metal oxide particles and semiconductive metal oxide particles on the second electrode with a binder to assure permeability to the electrolyte and satisfy a function as the antideterioration layer.

A material of the antideterioration layer is not particularly limited and may be appropriately selected depending on the intended purpose. In a case where a tint of the antideterioration layer does not matter, the material is preferably identical to the electrochromic material used in the electrochromic layer.

Examples of the binder include resins, such as acrylic resins, alkyd resins, isocyanate resins, urethane resins, epoxy resins, and phenol resins.

Examples of the conductive metal oxide particles include antimony tin oxide. Examples of the semiconductive metal oxide particles include nickel oxide, titanium oxide, zinc oxide, and tin oxide.

These particles may be used alone or in combination.

A position of the antideterioration layer is not particularly limited and may be appropriately selected depending on the intended purpose. The antideterioration layer is preferably arranged at either a surface of the second electrode facing the first electrode or a surface of the second electrode not facing the first electrode.

In the electrochromic device composed as described above, electric charges are given to or released from the electrochromic material by applying positive or negative voltage between the first electrode and the second electrode, and thus the electrochromic material carries out oxidation-reduction reactions to color or decolor. Note that, an antideterioration material that carries out a reverse reaction to a reaction carried out by the electrochromic material is preferably mixed in the first electrolyte layer and the second electrolyte layer.

(Method for Producing Electrochromic Device)

A method for producing an electrochromic device according to the present disclosure includes a laminating step, a second-electrode forming step, an electrolyte-solution introducing step, an electrolyte-solution applying step, an electrolyte-solution solidifying step, an inorganic-protective-layer forming step, and an organic-protective-layer forming step. The method may further include other steps, if necessary.

<<Laminating Step>>

The laminating step is a step of sequentially laminating the first electrode, the electrochromic layer, and the insulating porous layer on the support.

—Formation Method of First Electrode—

The formation method of the first electrode is not particularly limited and may be appropriately selected depending on the intended purpose, as long as the formation method is a formation method using a material of the first electrode. Examples of the formation method include vacuum vapor deposition, sputtering, ion plating, and printing.

The printing is not particularly limited and may be appropriately selected depending on the intended purpose. The printing is preferably a printing method that can apply a material of the first electrode through coating to form the first electrode. Examples of the printing include spin coating, casting, microgravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing.

—Formation Method of Electrochromic Layer—

The formation method of the electrochromic layer is not particularly limited and may be appropriately selected depending on the intended purpose, as long as the formation method is a formation method using a material of the electrochromic layer. Examples of the formation method include vacuum film formation and coating film formation.

In a case where the electrochromic layer is formed of an inorganic film, the electrochromic layer is typically formed through vacuum film formation. In a case where the electrochromic layer includes a layer of at least one of the conductive particles and the semiconductive particles, and an organic electrochromic material, the electrochromic layer is typically formed through coating film formation.

A structure where the organic electrochromic compound is born on at least one of the conductive particles and the semiconductive particles is formed, for example, by applying a particle dispersion paste to form at least one of the conductive particles and the semiconductive particles, followed by applying a coating liquid that is a solution in which the electrochromic material is dissolved, onto surfaces of the particles by dip coating or spin coating.

—Formation Method of Insulating Porous Layer—

A formation method of the insulating porous layer is not particularly limited and may be appropriately selected depending on the intended purpose, as long as the formation method is a formation method using a material of the insulating porous layer. Examples of the formation method include a sintering method, an extraction method, a foaming method, a phase inversion method, and a radial-ray irradiation method.

The sintering method is a method where polymer particles or inorganic particles are added to a binder to partially fuse the particles, to thereby utilize pores formed between the particles.

The extraction method is a method where a constituting layer is formed with an organic material or inorganic material soluble in a solvent and a binder insoluble in the solvent, followed by dissolving the organic material or inorganic material with the solvent to obtain pores.

The foaming method is a method where a polymer is heated or deaerated to foam.

The phase inversion method is a method where a mixture of polymers is phase-separated by controlling a good solvent and a poor solvent.

The radial-ray irradiation method is a method where any of various radial rays is applied to form pores.

<<Second-Electrode Forming Step>>

The second-electrode forming step is a step of forming a second electrode, in which the through-holes are formed, on the insulating porous layer to face the first electrode.

—Formation Method of Second Electrode with Through-Holes—

Examples of a formation method of the second electrode, in which the through-holes are formed, include (1) a method where structures, such as micropillars or particles, are arranged before forming the second electrode, and the structures are removed after forming the second electrode, (2) a foamable high-molecular-weight polymer is scattered before forming the second electrode, and the high-molecular-weight polymer is foamed by a process, such as heating or deaerated after the second electrode, (3) a method where any of various radial rays is directly applied to the second electrode to form pores, and (4) a typical lift-off method using a photoresist or a dry film.

Examples of the (1) method include colloidal lithography.

In the colloidal lithography, first, particles to be a colloidal mask are scattered onto a layer, on which the second electrode will be laminated, and a conductive film that constitutes the second electrode is formed on the surface, on which the colloidal mask has been scattered. Thereafter, the conductive film coated and formed on the colloidal mask is removed together with the colloidal mask to thereby form the through-holes in the second electrode.

The colloidal lithography is advantageous because a large number of the through-holes can be easily formed in the second electrode by adjusting diameters of the particles of the colloidal mask to be scattered to equal to or greater than an average thickness of the second electrode. Moreover, a concentration and areas of the through-holes can be easily controlled by varying a concentration of the colloidal mask to be scattered, and a number average particle diameter of primary particles of the colloidal mask. Moreover, in-plane uniformity of the colloidal mask can be easily enhanced by a scattering method of the particle dispersion. Therefore, in-plane uniformity of a coloring-decoloring density of the electrochromic layer is enhanced, to thereby improve a display performance.

The colloidal lithography is specifically described below.

A material of the colloidal mask is not particularly limited and may be appropriately selected depending on the intended purpose. In view of cost efficiency, the material is preferably $SiO_2$ particles. As a dispersion used for scattering of the colloidal mask, a dispersion having excellent dispersibility is preferable. In a case where $SiO_2$ particles are used as a colloidal mask, for example, the dispersion is an aqueous dispersion.

In a case where there is a possibility that a damage may be caused on an underlying layer, such as the electrochromic layer, and the insulating porous layer, $SiO_2$ particles that have been subjected to a surface treatment to be dispersed in a non-aqueous solvent are preferably used as the colloidal mask. In this case, a non-aqueous dispersion can be used as the dispersion used for scattering the colloidal mask.

A number average particle diameter of primary particles in the colloidal mask is preferably equal to or greater than an average thickness of the second electrode, in which the through-holes are formed, and equal to or less than an average thickness of the electrochromic layer.

Examples of a removal method of the colloidal mask include dry washing, such as tape peeling, ultrasonic wave irradiation, or $CO_2$ blasting (dry ice blasting).

Among the above-listed methods, dry ice blasting is preferable because there is less possibility to damage underlying layers, such as the electrochromic layer and the insulating porous layer.

When the colloidal mask is removed by the tape peeling, the colloidal mask is often embedded in an adhesive layer because a thickness of the adhesive layer of a typical tape is 1 μm or greater. In this case, the adhesive layer may be brought into contact with a surface of the second electrode, and thus a tape leaving less adhesive is preferably used.

In a case where the colloidal mask is removed by the ultrasonic wave irradiation, a solvent to which the second electrode to be formed is dipped is preferably a solvent that gives less damage to functional layers that have been formed.

Examples of the (3) method include a method where the through-holes are formed in the second electrode by a processing device using laser light. In a case where laser processing is used, diameters of the through-holes to be formed are typically 15 μm or greater.

Examples of the (4) method include a method where a desired photoresist pattern is formed first, and then the second electrode is formed, followed by removing the photoresist pattern to remove unnecessary parts of the second electrode formed on the photoresist pattern, to thereby form the through-holes in the second electrode. In order to avoid any damage caused on an underlying layer, such as the electrochromic layer, and the insulating porous layer, by light irradiation, a negative photoresist is preferably used as the photoresist to reduce a light irradiation area on a target.

Examples of the negative photoresist include polyvinyl cinnamate, styrylpyridinium formalized polyvinyl alcohol, glycol methacrylate/polyvinyl alcohol/initiator, polyglycidyl methacrylate, halomethylated polystyrene, diazo resins, bisazide/diene-based rubber, polyhydroxystyrene/melamine/photoacid generator, methylated melamine resins, and methylated urea resins.

<<Electrolyte-Solution Introducing Step>>

The electrolyte-solution introducing step is a step of introducing the electrolyte solution into the insulating porous layer through the through-holes.

A unit configured to introduce the electrolyte solution is not particularly limited and may be appropriately selected depending on the intended purpose.

<<Electrolyte Solution Applying Step>>

The electrolyte solution applying step is a step of applying the electrolyte solution onto the second electrode.

A unit configured to apply the electrolyte solution is not particularly limited and may be appropriately selected depending on the intended purpose.

<<Electrolyte-Solution Solidifying Step>>

The electrolyte-solution solidifying step is a step of solidifying the electrolyte solution.

A method for solidifying the electrolyte solution is not particularly limited and may be appropriately selected depending on the intended purpose. The method is preferably a method where a curable resin or a gelation agent is added to the electrolyte solution, and the electrolyte solution is solidified after introducing and applying the electrolyte solution. When the method for solidifying the electrolyte solution is the aforementioned preferable embodiment, it is advantageous because the electrolyte and the solvent can be retained in the polymer resin, and high electric conductivity and solid strength can be obtained.

The polymer resin is preferably a photocurable resin because an element can be produced at a low temperature within a short period compared to a method where a thin film is formed by thermal polymerization or evaporating a solvent.

The polymer is preferably a polyether-based polymer in view of ion conductivity, and is preferably solidified as a matrix polymer containing an oxyethylene chain or an oxypropylene chain.

<<Inorganic-Protective-Layer Forming Step>>

The inorganic-protective-layer forming step is a step of forming the inorganic protective layer on the solidified electrolyte solution.

A formation method of the inorganic protective layer is not particularly limited and may be appropriately selected depending on the intended purpose, as long as the formation method is a formation method using a material of the inorganic protective layer. The formation method is preferably a method where the inorganic protective layer is formed by vacuum film formation that can form a dense film. Examples of the formation method include vacuum vapor deposition, sputtering, and ion plating.

<<Organic-Protective-Layer Forming Step>>

The organic-protective-layer forming step is a step of forming the organic protective layer on the inorganic protective layer.

A formation method of the organic protective layer is not particularly limited and may be appropriately selected depending on the intended purpose, as long as the formation method is a formation method using a material of the organic protective layer. Examples of the formation method include spin coating, casting, microgravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing.

Moreover, the organic protective layer may be disposed at side surfaces of each layer, not only on the inorganic protective layer. It is also possible to separately apply the organic protective layer on the side surfaces of each layer from the application on the top surface of the inorganic protective layer, and different materials may be used for the aforementioned organic protective layers.

<<Other Steps>>

The aforementioned other steps are not particularly limited and may be appropriately selected depending on the intended purpose. Examples of the aforementioned other steps include an antideterioration-layer forming step for forming the antideterioration layer.

A formation method of the antideterioration layer is not particularly limited and may be appropriately selected depending on the intended purpose, as long as the formation method is a formation method using a material of the antideterioration layer. Examples of the formation method include vacuum vapor deposition, sputtering, ion plating, and printing.

Examples of the printing include spin coating, casting, microgravure coating, gravure coating, bar coating, roll coating, wire bar coating, dip coating, slit coating, capillary coating, spray coating, nozzle coating, gravure printing, screen printing, flexographic printing, offset printing, reverse printing, and inkjet printing.

Next, examples of the electrochromic device and the production method according to the present disclosure will be described with reference to drawings.

Note that, in each drawing, an identical referential number is given to an identical component, and duplicated descriptions may be omitted. Moreover, the number, positions, and shapes of the following constitutional members are not limited to the present embodiments, and the number, positions, and shapes of the members may be appropriately changed to suit to carry out the present disclosure.

First Embodiment

FIG. 1 is a schematic cross-sectional view illustrating one example of the electrochromic device of the first embodiment.

As illustrated in FIG. 1, the electrochromic device 10 includes a support 11, and a first electrode 12, an electrochromic layer 13, a first electrolyte layer 14, a second electrode 15, a second electrolyte layer 16, an inorganic protective layer 17, and an organic protective layer 18 sequentially laminated over the support 11.

In the first embodiment, the first electrode 12 is in contact with the support 11, and a surface of the first electrode 12 facing the second electrode 15 is in contact with the electrochromic layer 13.

A surface of the second electrode 15 facing the first electrode 12 is in contact with first electrolyte layer 14, and a surface of the second electrode 15 not facing the first electrode 12 is in contact with the second electrolyte layer 16.

In the second electrode 15, moreover, a large number of fine through-holes bored through in a thickness direction of the second electrode are formed.

The first electrolyte layer 14 is formed with the insulating porous layer as a skeleton. The insulating porous layer is configured to achieve electrical insulation between the first electrode 12 and the second electrode 15, is filled with the electrolyte solution, and contains insulating metal oxide particles.

Moreover, the organic protective layer 18 is formed on the inorganic protective layer 17.

Note that, the support 11 is in a plate shape in FIG. 1, but the support 11 may be in a curved shape.

A production process of the electrochromic device 10 includes a step of sequentially laminating a first electrode 12, an electrochromic layer 13, and the insulating porous layer on a support 11, a step of forming a second electrode 15, in which through-holes are formed, on the insulating porous layer in a manner that the second electrode 15 faces the first electrode 12, a step of introducing an electrolyte solution into the insulating porous layer through the through-holes, a step of applying the electrolyte solution onto the second electrode 15, a step of solidifying the electrolyte solution, a step of forming an inorganic protective layer 17 on the solidified electrolyte solution, and a step of forming an organic protective layer 18 on the inorganic protective layer 17.

Specifically, the through-holes formed in the second electrode 15 are holes for introducing the electrolyte solution in the production process of the electrochromic device. In a case where the second electrode 15 is directly formed on the electrolyte to omit a bonding process, there has been a problem that electric resistance of the second electrode 15 becomes high. However, this problem can be avoided by forming the insulating porous layer on the electrochromic layer 13 using the first electrolyte layer 14 as a skeleton, laminating the second electrode 15, in which the through-holes are formed, on the insulating porous layer, and introducing an electrolyte solution into the insulating porous layer through through-holes. Moreover, an electrochromic device can be easily produced without a bonding process, and the electrochromic device can be formed even when the support 11 is any of various shapes. Therefore, an application range of the electrochromic device can be widened.

Furthermore, a scale of the electrochromic device can be easily increased, and the electrochromic device of excellent productivity can be provided, because a support is not disposed on a surface of the second electrode 15 facing the first electrode 12 (a support is unnecessary at one side of the device).

Second Embodiment

FIG. 2 is a schematic cross-sectional view illustrating one example of the electrochromic device of the second embodiment.

The second embodiment in FIG. 2 is an example of the electrochromic device having a different layer structure to that of the first embodiment.

Comparing the electrochromic device 20 of the second embodiment with the electrochromic device 10 (see FIG. 1) of the first embodiment, the electrochromic device 20 of the second embodiment is different from the electrochromic device 10 of the first embodiment in that the electrochromic layer 13 and the first electrolyte layer 14 are integrated as an electrochromic-material-containing electrolyte layer 19.

A production process of the electrochromic device 20 includes a step of sequentially laminating a first electrode 12 and the insulating porous layer on a support 11, a step of forming a second electrode 15, in which through-holes are formed, on the insulating porous layer in a manner that the second electrode 15 faces the first electrode 12, a step of introducing an electrolyte solution containing an electrochromic material into the insulating porous layer through the through-holes, a step of applying the electrolyte solution onto the second electrode 15, a step of solidifying the electrolyte solution, a step of forming an inorganic protective layer 17 on the solidified electrolyte solution, and a step of forming an organic protective layer 18 on the inorganic protective layer 17.

The electrochromic device 20 of the second embodiment exhibits the following effects, in addition to the effects of the first embodiment. Specifically, one step for forming a layer is omitted when the electrochromic material is dissolved in or made compatible with the electrolyte solution. Therefore, an electrochromic device can be produced more easily.

In the electrochromic device 20, electric charges are given to or released from the electrochromic-material-containing electrolyte layer 19 by applying voltage between the first electrode 12 and the second electrode 15, and thus the electrochromic material carries out oxidation-reduction reactions to color or decolor. Note that, an antideterioration material that carries out a reverse reaction to a reaction carried out by the electrochromic material is preferably mixed in the electrochromic-material-containing electrolyte layer 19.

Third Embodiment

Figure 3:
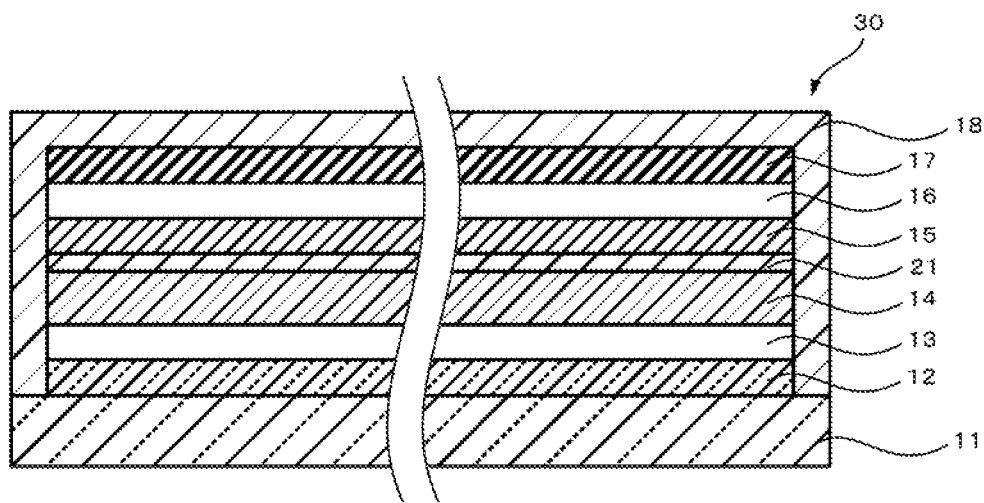
FIG. 3 is a schematic cross-sectional view illustrating one example of an electrochromic device of a third embodiment.

FIG. 3 is a schematic cross-sectional view illustrating one example of the electrochromic device of the third embodiment.

The third embodiment in FIG. 3 is an example of the electrochromic device having a different layer structure to that of the first embodiment.

The electrochromic device 30 of the third embodiment is different from the electrochromic device 10 (see FIG. 1) of the first embodiment in that the antideterioration layer 21 is formed on a surface of the second electrode 15 facing the first electrode 12.

A production process of the electrochromic device 30 includes a step of subsequently laminating a first electrode 12, an electrochromic layer 13, the insulating porous layer, and an antideterioration layer 21 on a support 11, a step of forming a second electrode 15, in which through-holes are formed, on the antideterioration layer 21 in a manner that the second electrode 15 faces the first electrode 12, a step of introducing an electrolyte solution into the insulating porous layer through the through-holes via the antideterioration layer 21, a step applying the electrolyte solution onto the second electrode 15, a step of solidifying the electrolyte solution, a step of forming an inorganic protective layer 17 on the solidified electrolyte solution, and a step of forming an organic protective layer 18 on the inorganic protective layer 17.

The electrochromic device 30 of the third embodiment exhibits the following effects, in addition to the effects of the second embodiment. Specifically, an electrochromic device having a high coloring and decoloring efficiency can be produced because the electrochromic layer 13 and the antideterioration layer 21 are secured on a surface of the second electrode 15.

Moreover, the inorganic protective layer 17 is formed on the second electrode layer 16 that is formed on a surface of the second electrode not facing the first electrode. Use of the inorganic protective layer 17 can reduce an influence from environmental conditions (e.g., water vapor).

Note that, the antideterioration layer 21 needs to be composed of a porous thin film or permeable thin film that can be filled with an electrolyte. The antideterioration layer 21 formed of the porous thin film can be easily produced because the antideterioration layer 21 has a structure where an oxidation-reduction material is formed on surfaces of conductive nanoparticles or semiconductive particles.

In the electrochromic device 30, electric charges are given to or released from the electrochromic layer 13 by applying voltage between the first electrode 12 and the second electrode 15, and thus the electrochromic material carries out oxidation-reduction reactions to color or decolor. In a case where the antideterioration layer 21 contains an electrochromic material, the antideterioration layer 21 also colors or decolors as a result of oxidation-reduction reactions caused by giving or releasing electric charges.

Fourth Embodiment

Figure 4:
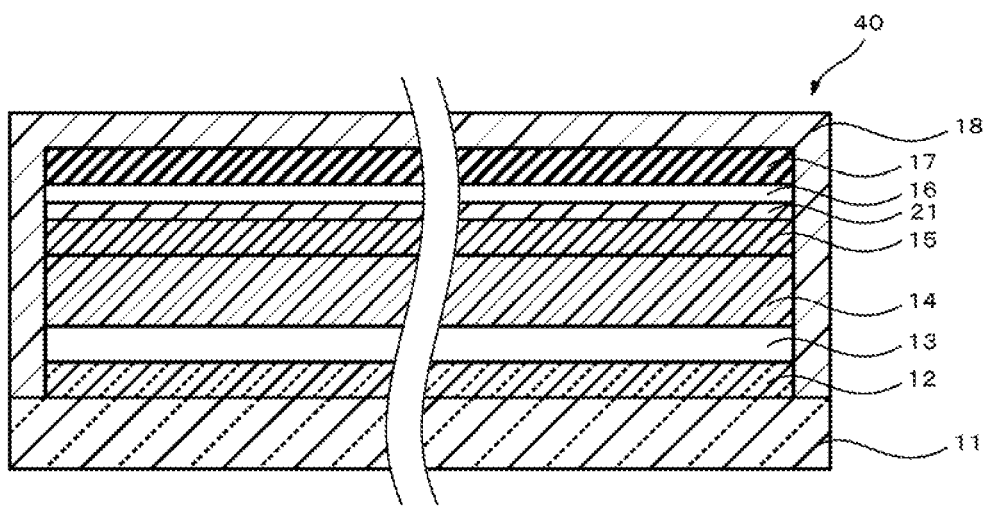
FIG. 4 is a schematic cross-sectional view illustrating one example of an electrochromic device of a fourth embodiment.

FIG. 4 is a schematic cross-sectional view illustrating one example of the electrochromic device of the fourth embodiment.

The fourth embodiment in FIG. 4 is an example of the electrochromic device having a different layer structure to that of the first embodiment. Note that, in the fourth embodiment, descriptions of identical components to those in the embodiments already described may be omitted.

The electrochromic device 40 of the fourth embodiment is different from the electrochromic device 30 (see FIG. 3) of the third embodiment in that the antideterioration layer 21 is formed on a surface of the second electrode 15 not facing the first electrode 12.

A production process of the electrochromic device 40 includes a step of sequentially laminating a first electrode 12, an electrochromic layer 13, and the insulating porous layer on a support 11, a step of forming a second electrode 15, in which through-holes are formed, on the insulating porous layer in a manner that the second electrode 15 faces the first electrode 12, a step of forming an antideterioration layer 21 on the second electrode 15, a step of introducing an electrolyte solution into the insulating porous layer through the through-holes via the antideterioration layer 21, a step of applying the electrolyte solution onto the antideterioration layer 21, a step of solidifying the electrolyte solution, a step of forming an inorganic protective layer 17 on the solidified electrolyte solution, and a step of forming an organic protective layer 18 on the inorganic protective layer 17.

The electrochromic device 40 of the fourth embodiment exhibits the following effects, in addition to the effects of the third embodiment. Specifically, the antideterioration layer 21 is not formed as an underlying layer of the second electrode 15, and thus it can be avoided to damage the antideterioration layer 21 when the through-holes are formed. According to the fourth embodiment, freedom for selecting materials for constituting the antideterioration layer 21 is increased.

Fifth Embodiment

Figure 5:
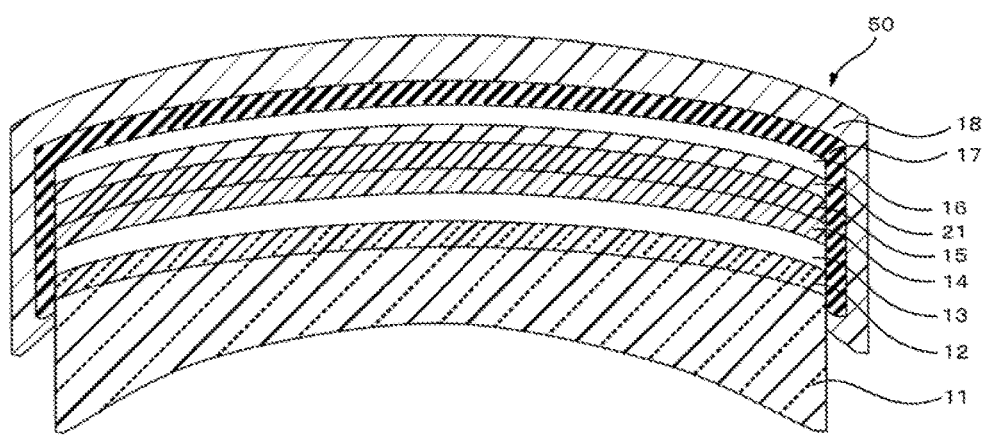
FIG. 5 is a schematic cross-sectional view illustrating one example of an electrochromic device of a fifth embodiment.

FIG. 5 is a schematic cross-sectional view illustrating one example of the electrochromic device of the fifth embodiment.

The fifth embodiment in FIG. 5 is an example of the electrochromic device where each layer is formed on a support different from the support used in each of from the first embodiment through the fourth embodiment. Note that, in the fifth embodiment, descriptions of identical components to those in the embodiments already described may be omitted.

The electrochromic device 50 of the fifth embodiment is different from the electrochromic device 40 (see FIG. 4) of the fourth embodiment in that the support 11 is replaced with a support 101 that is an optical lens.

In the fifth embodiment, a surface of the first electrode 12 facing the second electrode 15 is in contact with the electrochromic layer 13, and a surface of the first electrode 12 not facing the second electrode 15 is in contact with the support 101. Through-holes are formed in the second electrode 15.

A surface of the support 101, on which each layer is formed, is a curved surface. Accordingly, it is extremely difficult to form each layer according to a conventional method where two supports are bonded together with an electrolyte solution being between the supports. Even if the supports can be bonded together, a thickness, weight, and cost of a resultant electrochromic device are increased because two lenses are used as the supports. On the other hand, layers can be formed and laminated on a curved surface of the support, to which the layers are formed, by the above-described production method without a bonding process, similar to a case where a surface of the support to which the layers are formed is a flat surface. Note that, the support 101 may be a concave lens or a lens for spectacles.

The electrochromic device of the fifth embodiment exhibits the following effects, in addition to the effects of the fourth embodiment. Specifically, an optical element having a curved surface, such as an optical lens, and a lens for spectacles, can be selected as the support, because a support having a curved surface as a surface, to which layers are formed, can be used. Use of the optical element, such as an optical lens, and a lens for spectacles, can realize an electrochromic device that can be easily dimmed (an optical device that can be dimmed electrically).

EXAMPLES

The present disclosure will next be described by way of Examples, but the present disclosure should not be construed as being limited to these Examples.

Example 1

Production of Electrochromic Device

Example 1 describes an example where an electrochromic device having a structure illustrated in Tables 1-1 and 1-2 and FIG. 2 is produced. Note that, Electrochromic Device 1 produced in Example 1 can be used as dimming glass.

<<Formation of First Electrode>>

First, a glass substrate having a size of 40 mm×40 mm and an average thickness of 0.7 mm was prepared as a support 11. A first electrode 12 formed of an ITO film having an average thickness of 100 nm was formed on a region (in a size of 20 mm×20 mm) of the support 11 and a drawing part by sputtering using a metal mask.

<<Formation of Insulating Porous Layer>>

Subsequently, a $SiO_2$ particle dispersion liquid (silica solid content: 24.8% by mass, polyvinyl alcohol: 1.2% by mass, and water: 74% by mass), in which a number average particle diameter of primary particles of the $SiO_2$ particles was 20 nm, was applied onto the first electrode 12 by spin coating to thereby form an insulating porous layer having an average thickness of 2 μm. This insulating porous layer served as a skeleton of an electrochromic-material-containing electrolyte layer 19.

<<Formation of Second Electrode with Through-Holes>>

A $SiO_2$ particle dispersion liquid (silica solid content: 1% by mass, and 2-propanol: 99% by mass), in which a number average particle diameter of primary particles of the $SiO_2$ particles was 450 nm, was applied onto the formed insulating porous layer by spin coating, to thereby form a mask (colloidal mask) for forming fine through-holes.

An inorganic film of ZnS—$SiO_2$ (8/2, mass ratio) was formed on the formed mask for forming fine through-holes by sputtering to give the inorganic film having an average thickness of 40 nm. Moreover, a second electrode 15 formed of an ITO film having an average thickness of 100 nm was formed on a region (in a size of 20 mm×20 mm) of the inorganic film that overlapped with the formed first electrode 12, and a region of the inorganic film that did not overlap with the first electrode 12, by sputtering using a metal mask. Note that, the ITO film formed on the region that did not overlap with the first electrode 12 was a drawing part of a second electrode 15.

Thereafter, the resultant was irradiated with ultrasonic waves for 3 minutes in 2-propanol to thereby remove $SiO_2$ particles that constituted the colloidal mask. It was confirmed by observation under SEM that a second electrode 15 having through-holes of 250 nm was formed. Moreover, a sheet resistance of the second electrode 15 was 100 Ω/□.

The sheet resistance was measured on the region that did not overlap with the first electrode 12 by means of a resistivity meter (Loresta (registered trade mark) GP MCP-T610, available from Mitsubishi Chemical Analytech Co., Ltd.) according to four-terminal sensing.

<<Introduction and Solidification of Electrolyte Solution Containing Electrochromic Material>>

An electrolyte solution was prepared as a solution by blending lithium perchlorate serving as the electrolyte, polyethylene glycol (molecular weight: 200) and propylene carbonate serving as the solvents, and a urethane adhesive (LOCTITE (registered trade mark) 3301, available from Henkel) serving as the UV-curable material at a mass ratio ([lithium perchlorate][polyethylene glycol][propylene carbonate]:[urethane adhesive]) of 1.4:6:8:10. In the electrolyte solution, 0.5% by mass of the compound represented by the following structural formula A serving as an electrochromic material was dissolved. Into the resultant, 10% by mass of a 30% by mass $SiO_2$ nanoparticles methyl ethyl ketone dispersion liquid (organosilica sol, available from NISSAN CHEMICAL INDUSTRIES, LTD., from 10 nm through 15 nm standard type) was blended. The resultant electrolyte solution was applied onto a surface of the second electrode 15, in which the through-holes had been formed, by spin coating, followed by drying on a hot plate of 120° C. for 1 minute, to thereby introduce the electrolyte solution containing the electrochromic material, and apply the electrolyte solution onto the second electrode 15. Thereafter, the electrolyte solution was solidified upon application of UV light, to thereby form an electrolyte layer 19 containing the electrochromic material, and a second electrolyte layer 16.

[Structural formula A]

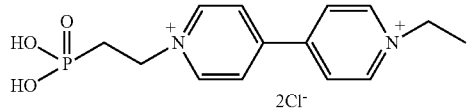

<<Formation of Inorganic Protective Layer>>

Subsequently, a $SiO_2$ film having an average thickness of 90 nm was formed on the second electrolyte layer 16 by sputtering, to thereby form an inorganic protective layer 17.

<<Formation of Organic Protective Layer>>

A coating liquid, in which 5% by mass of a photopolymerization initiator (IRGACURE 184, available from BASF) was added to a UV ray-curable adhesive (KAYARAD R-604, available from Nippon Kayaku Co., Ltd.), was applied onto the formed inorganic protective layer 17 by spin coating, followed by curing by application of UV light, to thereby form an organic protective layer 18 having an average thickness of 3 μm.

In the above-described manner, Electrochromic Device 1 having the structure illustrated in Tables 1-1 and 1-2 and FIG. 2 was obtained.

<Evaluations>

The obtained Electrochromic Device 1 was evaluated in the following manners.

<<Coloring and Decoloring Evaluation>>

Coloring and decoloring of the Electrochromic Device 1 were confirmed.

Specifically, the predetermined voltage was applied between the drawing part of the first electrode 12 and the drawing part of the second electrode 15 for the predetermined duration. The predetermined voltage was such that the voltage applied to the first electrode 12 is lower than the voltage applied to the second electrode 15. As a result, coloring in blue derived from the electrochromic compound represented by the structural formula A was observed in the area where the first electrode 12 and the second electrode 15 are overlapped.

Moreover, the predetermined voltage was applied between the drawing part of the first electrode 12 and the drawing part of the second electrode 15 for the predetermined duration. The predetermined voltage was such that the voltage applied to the first electrode 12 is higher than the voltage applied to the second electrode 15. As a result, it was confirmed that the dye in the area where the first electrode 12 and the second electrode 15 were overlapped was decolored and became transparent. Note that, the predetermined voltage applied for the electrochromic device 1 was 3.5 V, and the predetermined duration was 3 seconds. Moreover, the evaluation result according to the following criteria are presented in Table 2.

[Evaluation Criteria]

A: Coloring and decoloring were confirmed.

B: A contrast between coloring and decoloring was small, but it was a level that would not cause any problem on practical use.

C: Coloring and decoloring were not confirmed.

<<Repeating Stability Evaluation>>

An operation for coloring and decoloring, where the predetermined voltage was applied for 5 seconds each on the obtained Electrochromic Device 1 with switching a polarity of the voltage, was performed repeatedly 500 times, and the result was evaluated according to the following criteria. The results are presented in Table 2.

[Evaluation Criteria]

A: No significant deterioration, such that coloring and decoloring could not be confirmed, was observed, and it was confirmed that Electrochromic Device 1 could be stably operated.

B: A slight deterioration in coloring and decoloring was observed, but it was a level that would not cause a problem on practical use.

C: The element resistance was significantly increased, and coloring and decoloring were not sufficiently obtained.

<<High-Temperature Standing Test Evaluation>>

Subsequently, the Electrochromic Device 1 was subjected to a high temperature standing test, where Electrochromic Device 1 was left to stand for 240 hours at 60° C. After the high temperature standing test, coloring and decoloring operations were performed under the same driving conditions as those of the coloring and decoloring evaluation. The results were evaluated according to the following criteria. The results are presented in Table 2.

[Evaluation Criteria]

A: No significant deterioration, such that coloring and decoloring could not be confirmed, was observed, and it was confirmed that the Electrochromic Device 1 could be stably operated.

B: A slight deterioration in coloring and decoloring was observed, but it was a level that would not cause a problem on practical use.

C: The organic protective layer was partially peeled, and there was a region that did not color and decolor.

<<Comprehensive Evaluation>>

A comprehensive evaluation was performed based on the results of the coloring decoloring evaluation, the repeating stability evaluation, and the high temperature standing test evaluation according to the following criteria. The results are presented in Table 2.

[Evolution Criteria]
A: All of the results were A.
B: There was one or more B, but was no C.
C: There was one or more C.

Example 2

Production of Electrochromic Device

Example 2 describes an example where Electrochromic Device 2 having a structure illustrated in Tables 1-1 and 1-2 and FIG. 4 is produced. Note that, the Electrochromic Device 2 produced in Example 2 can be used as dimming glass.

<<Formation of First Electrode>>

First, a glass substrate having a size of 40 mm×40 mm and an average thickness of 0.7 mm was prepared as a support 11. A first electrode 12 formed of an ITO film having an average thickness of 100 nm was formed on a region (in a size of 20 mm×20 mm) of the support 11 and a drawing part by sputtering using a metal mask.

<<Formation of Electrochromic Layer>>

On a Surface of the ITO Film Serving as the First Electrode 12, a tetrahydrofuran solution containing 2.5% by mass of a compound represented by the following structural formula B (average molecular weight: 10,000) was applied by spin coating, followed by annealing for 10 minutes at 60° C., to thereby form an electrochromic layer 13 formed of an organic polymer material. Note that, the electrochromic layer 13 was magenta in color.

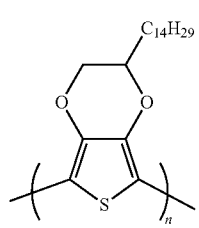

[Structural formula B]

<<Formation of Insulating Porous Layer>>

Subsequently, a $SiO_2$ particle dispersion liquid (silica solid content: 24.8% by mass, polyvinyl alcohol: 1.2% by mass, and water: 74% by mass), in which a number average particle diameter of primary particles of the $SiO_2$ particles was 20 nm, was applied onto the first electrode 12 by spin coating to thereby form an insulating porous layer 14 having an average thickness of 2 μm.

<<Formation of Second Electrode with Through-Holes>>

Subsequently, a $SiO_2$ particle dispersion liquid (silica solid content: 1% by mass, and 2-propanol: 99% by mass), in which a number average particle diameter of primary particles of the $SiO_2$ particles was 450 nm, was applied onto the formed insulating porous layer 14 by spin coating, to thereby form a mask (colloidal mask) for forming fine through-holes.

An organic film of $ZnS$—$SiO_2$ (8/2, mass ratio) was formed on the formed mask for forming fine through-holes by sputtering to give the inorganic film having an average thickness of 40 nm. Moreover, a second electrode 15 formed of an ITO film having an average thickness of 100 nm was formed on a region (in a size of 20 mm×20 mm) of the inorganic film that overlapped with the formed first electrode 12, and a region of the inorganic film that did not overlap with the first electrode 12, by sputtering using a metal mask. Note that, the ITO film formed on the region that did not overlap with the first electrode 12 was a drawing part of a second electrode 15.

Thereafter, the resultant was irradiated with ultrasonic waves for 3 minutes in 2-propanol to thereby remove $SiO_2$ particles that constituted the colloidal mask. It was confirmed by observation under SEM that a second electrode 15 having through-holes of 250 nm was formed. Moreover, a sheet resistance of the second electrode 15 was 100 Ω/□.

The sheet resistance was measured on the region that did not overlap with the first electrode 12 by means of resistivity meter (Loresta (registered trade mark) GP MCP-T610, available from Mitsubishi Chemical Analytech Co., Ltd.) according to four-terminal sensing.

<<Formation of Antideterioration Layer>>

Subsequently, a titanium oxide nanoparticle dispersion liquid (SP210, available from SHOWA DENKO K.K., number average particle diameter of primary particles: 20 nm) was applied onto the second electrode 15 by spin coating. Thereafter, annealing was performed on the applied dispersion liquid for 15 minutes at 120° C., to thereby form a nanostructure semiconductor material layer formed of a titanium oxide particle film having an average thickness of 1.0 μm, i.e., an antideterioration layer 21.

<<Introduction and Solidification of Electrolyte>>

An electrolyte solution was prepared as a solution by blending lithium perchlorate serving as the electrolyte, polyethylene glycol (molecular weight: 200) and propylene carbonate serving as the solvents, and a urethane adhesive (LOCTITE (registered trade mark) 3301, available from Henkel) serving as the UV-curable material at a mass ratio ([lithium perchlorate]:[polyethylene glycol]:[propylene carbonate]:[urethane adhesive]) of 1.4:6:8:10. Into the electrolyte solution, 10% by mass of a 30% by mass $SiO_2$ nanoparticles methyl ethyl ketone dispersion liquid (organosilica sol, available from NISSAN CHEMICAL INDUSTRIES, LTD., from 10 nm through 15 nm standard type) was blended. The resultant electrolyte solution was applied onto a surface of the second electrode 15, in which the through-holes had been formed, by spin coating, followed by drying on a hot plate of 120° C. for 1 minute, to thereby introduce the electrolyte solution. Thereafter, the electrolyte solution was solidified upon application of UV light, to thereby form a second electrolyte layer 16.

<<Formation of Inorganic Protective Layer>>

Subsequently, a $SiO_2$ film having an average thickness of 90 nm was formed on the second electrolyte layer 16 by sputtering, to thereby form an inorganic protective layer 17.

<<Formation of Organic Protective Layer>>

A coating liquid, in which 5% by mass of a photopolymerization initiator (IRGACURE 184, available from BASF) was added to a UV ray-curable adhesive (KAYARAD R-604, available from Nippon Kayaku Co., Ltd.), was applied onto the formed inorganic protective layer 17 by spin coating, followed by curing by application of UV light, to thereby form an organic protective layer 18 having an average thickness of 3 μm.

In the above-described manner, Electrochromic Device 2 having the structure illustrated in Tables 1-1 and 1-2 and FIG. 4 was obtained.

The obtained Electrochromic Device 2 was evaluated in the same manner as in Example 1, with the predetermined voltage being 3 V and the predetermined duration being 2 seconds. The results are presented in Table 2. Note that, coloring was magenta derived from the electrochromic compound represented by the structural formula B.

Example 3

Production of Electrochromic Device

Example 3 describes an example where Electrochromic Device 3 having a structure illustrated in Tables 1-1 and 1-2 and FIG. 4 is produced. Note that, Electrochromic Device 3 produced in Example 3 can be used as a dimming glass device.

<<Formation of First Electrode>>

First, a glass substrate having a size of 40 mm×40 mm and an average thickness of 0.7 mm was prepared as a support 11. A first electrode 12 formed of an ITO film having an average thickness of 100 nm was formed on a region (in a size of 20 mm×20 mm) of the support 11 and a drawing part by sputtering using a metal mask.

<<Formation of Electrochromic Layer>>

On a surface of the ITO film serving as the first electrode 12, a solution prepared by blending the compound represented by the following structural formula C, polyethylene glycol cliacrylate (KAYARAD PEG400DA, available from Nippon Kayaku Co., Ltd.), a photopolymerization initiator (IRGACURE 184, available from BASF), and tetrahydrofuran at a mass ratio ([compound represented by the structural formula C]:[polyethylene glycol diacrylate]:[photopolymerization initiator]:[tetrahydrofuran]) of 10:5:0.25:85 was applied by spin coating, followed by annealing for 1 minute for 60° C. Then, the solution was cured upon application of UV light, to thereby form an electrochromic layer 13 formed of an organic polymer material.

the formed insulating porous layer 14 by spin coating, to thereby form a mask (colloidal mask) for forming fine through-holes.

An organic film of ZnS—SiO$_2$ (8/2, mass ratio) was formed on the formed mask for forming fine through-holes by sputtering to give the inorganic film having an average thickness of 40 nm. Moreover, a second electrode 15 formed of an ITO film having an average thickness of 100 nm was formed on a region (in a size of 20 mm×20 mm) of the inorganic film that overlapped with the formed first electrode 12, and a region of the inorganic film that did not overlap with the first electrode 12, by sputtering using a metal mask. Note that, the ITO film formed on the region that did not overlap with the first electrode 12 was a drawing part of a second electrode 15.

Thereafter, the resultant was irradiated with ultrasonic waves for 3 minutes in 2-propanol to thereby remove SiO$_2$ particles of 450 nm that constituted the colloidal mask. It was confirmed by observation under SEM that a second electrode 15 having through-holes of 250 nm was formed. Moreover, a sheet resistance of the second electrode 15 was 100 Ω/□.

The sheet resistance was measured on the region that did not overlap with the first electrode 12 by means of resistivity meter (Loresta (registered trade mark) GP MCP-T610, available from Mitsubishi Chemical Analytech Co., Ltd.) according to four-terminal sensing.

<<Formation of Antideterioration Layer>>

Subsequently, a titanium oxide nanoparticle dispersion liquid (SP210, available from SHOWA DENKO K.K., number average particle diameter of primary particles: 20 nm) was applied onto the second electrode 15 by spin coating, followed by annealing for 15 minutes at 120° C., to thereby form a nanostructure semiconductor material layer formed of a titanium oxide particle film having an average thickness of 1.0 μm, i.e., an antideterioration layer 21.

[Structural formula C]

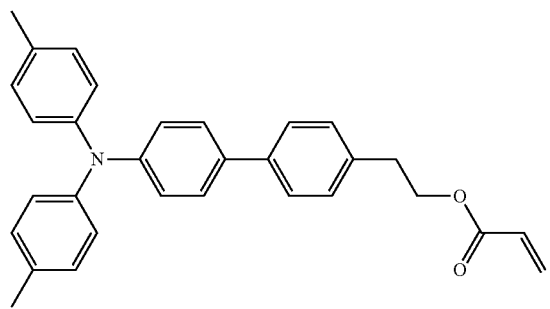

<<Formation of Insulating Porous Layer>>

Subsequently, a SiO$_2$ particle dispersion liquid (silica solid content: 24.8% by mass, polyvinyl alcohol: 1.2% by mass, and water: 74% by mass), in which a number average particle diameter of primary particles of the SiO$_2$ particles was 20 nm, was applied onto the first electrode 12 by spin coating to thereby form an insulating porous layer 14 having an average thickness of 2 μm.

<<Formation of Second Electrode with Through-Holes>>

Subsequently, a SiO$_2$ particle dispersion liquid (silica solid content: 1% by mass, and 2-propanol: 99% by mass), in which a number average particle diameter of primary particles of the SiO$_2$ particles was 450 nm, was applied onto <<Introduction and Solidification of Electrolyte>>

A solution prepared by blending a (FSO$_2$)$_2$N$^-$ salt of 1-ethyl-3-methyl imidazolium serving as the electrolyte, polyethylene glycol diacrylate (KAYARAD PEG400DA, available from Nippon Kayaku Co., Ltd.), a photopolymerization initiator (IRGACURE 184, available from BASF), and a 40% by mass SiO$_2$ nanoparticle methanol dispersion liquid (organosilica sol, available from NISSAN CHEMICAL INDUSTRIES, LTD., 10 nm through 15 nm standard type) at a mass ratio ([(FSO$_2$)$_2$N$^-$ salt of 1-ethyl-3-methyl-imidazolium]:[polyethylene glycol diacrylate]:[photopolymerization initiator]:[40% by mass SiO$_2$ nanoparticle methanol dispersion liquid]) of 2:3:0.15:10, was applied onto a surface of the second electrode 15, in which the through-holes had been formed, by spin coating, followed by drying on a hot plate for 1 minute at 60° C., to thereby introduce the electrolyte. Thereafter, UV light was applied to solidify the solution to thereby form a second electrolyte layer 16.

<<Formation of Inorganic Protective Layer>>

Subsequently, a $SiO_2$ film having an average thickness of 90 nm was formed on the second electrolyte layer 16 by sputtering, to thereby form an inorganic protective layer 17.

<<Formation of Organic Protective Layer>>

A coating liquid, in which 5% by mass of a photopolymerization initiator (IRGACURE 184, available from BASF) was added to a UV ray-curable adhesive (KAYARAD R-604, available from Nippon Kayaku Co., Ltd.), was applied onto the formed inorganic protective layer 17 by spin coating, followed by curing by application of UV light, to thereby form an organic protective layer 18 having an average thickness of 3 μm.

In the above-described manner, Electrochromic Device 3 having the structure illustrated in Tables 1-1 and 1-2 and FIG. 4 was obtained.

The obtained Electrochromic Device 3 was evaluated in the same manner as in Example 1, with the predetermined voltage being 2.5 V and the predetermined duration being 3 seconds. The results are presented in Table 2. Note that, coloring was blue derived from the electrochromic compound represented by the structural formula C.

Example 4

Electrochromic Device 4 having the structure illustrated in Tables 1-1 and 1-2 and FIG. 4 was obtained in the same manner as in Example 3, except that the compound represented by the following structural formula D was added as the electrochromic material to the antideterioration layer 21. Note that, the Electrochromic Device 4 can be used as a dimming film.

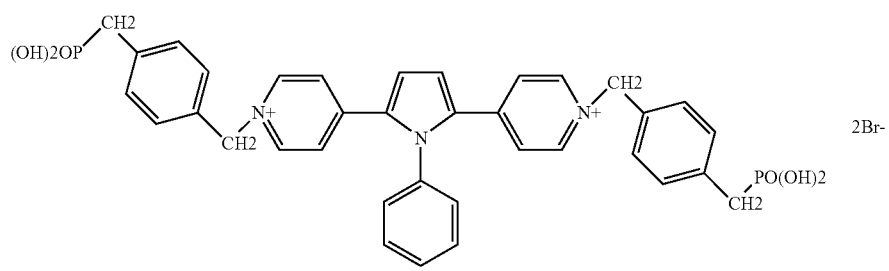

[Structural formula D]

The obtained Electrochromic Device 4 was evaluated in the same manner as in Example 1. The results are presented in Table 2. Note that, the predetermined voltage was 1 V and the predetermined duration was 3 seconds. Moreover, coloring was a mixed color of blue derived from the electrochromic compound represented by the structural formula C, and magenta derived from the electrochromic compound represented by the structural formula D.

Example 5

Electrochromic Device 5 was produced in the same manner as in Example 4, except that $SiO_2$ nanoparticles were not contained in the electrolyte solution. The Electrochromic Device 5 was evaluated in the same manner as in Example 4. The results are presented in Table 2.

Example 6

Electrochromic Device 6 was produced in the same manner as in Example 4, except that the antideterioration layer 21 was not formed. The obtained Electrochromic Device 6 was evaluated in the same manner as in Example 4. The results are presented in Table 2.

Comparative Example 1

Electrochromic Device 7 was produced in the same manner as in Example 4, except that the inorganic protective layer 17 was not formed. The obtained Electrochromic Device 7 was evaluated in the same manner as in Example 4. The results are presented in Table 2. Note that, the predetermined voltage was 1.5 V, and the predetermined duration was 3 seconds.

Comparative Example 2

Electrochromic Device 8 was produced in the same manner as in Example 4, except that the layers were laminated in the manner that the position of the inorganic protective layer 17 and the position of the organic protective layer 18 were reversed. The obtained Electrochromic Device 8 was evaluated in the same manner as in Example 4. The results are presented in Table 2.

TABLE 1-1

| Electro-chromic device No. | Reference structural diagram | Contact between protective layer and electrolyte | Inorganic protective layer | Electrolyte Inorganic material particles |
|---|---|---|---|---|
| Ex. 1 | FIG. 2 | No contact | Present | $SiO_2$ nanoparticles |
| Ex. 2 | FIG. 4 | | | |

TABLE 1-1-continued

| Electro-chromic device No. | Reference structural diagram | Contact between protective layer and electrolyte | Inorganic protective layer | Electrolyte Inorganic material particles |
|---|---|---|---|---|
| Ex. 3 | 3 | | | |
| Ex. 4 | 4 | | | |
| Ex. 5 | 5 | | | No |
| Ex. 6 | 6 | | | $SiO_2$ nanoparticles |
| Comp. Ex. 1 | 7 | FIG. 4 | Contact | Absent | $SiO_2$ nanoparticles |
| Comp. Ex. 2 | 8 | | | Present | |

TABLE 1-2

| Electrochromic device No. | Antideterioration layer Presence | Antideterioration layer Semiconductive metal oxide particles | Second electrode Electrochromic material | Diameters of through-holes | Insulating porous layer Insulating metal oxide particles | Electrochromic layer Electrochromic material |
|---|---|---|---|---|---|---|
| Ex. 1 | 1 | Absent | NA | Absent | 250 nm | SiO₂ particles | Structural formula A |
| Ex. 2 | 2 | Present | Titanium oxide nanoparticles | | | | Structural formula B |
| Ex. 3 | 3 | | | | | | Structural formula C |
| Ex. 4 | 4 | | | Structural formula D | | | |
| Ex. 5 | 5 | | | | | | |
| Ex. 6 | 6 | Absent | NA | | | | |
| Comp. Ex. 1 | 7 | Present | Titanium oxide nanoparticles | Structural formula D | 250 nm | SiO₂ particles | Structural formula C |
| Comp. Ex. 2 | 8 | | | | | | |

TABLE 2

| Electrochromic device No. | Evaluation result Coloring decoloring evaluation | Repeating stability | High temperature standing test | Comprehensive evaluation |
|---|---|---|---|---|
| Ex. 1 | 1 | A | B | A | B |
| Ex. 2 | 2 | A | A | A | A |
| Ex. 3 | 3 | A | A | A | A |
| Ex. 4 | 4 | A | A | A | A |
| Ex. 5 | 5 | B | B | B | B |
| Ex. 6 | 6 | B | B | A | B |
| Comp. Ex. 1 | 7 | C | C | C | C |
| Comp. Ex. 2 | 8 | C | B | C | C |

Aspects of the present disclosure are as follows, for example.

<1> An electrochromic device including:
a support;
a first electrode formed on the support;
a second electrode facing the first electrode, where through-holes are formed in the second electrode;
an electrochromic layer disposed in a space between the first electrode and the second electrode;
a first electrolyte layer disposed in the space between the first electrode and the second electrode;
a second electrolyte layer disposed to communicate with the first electrolyte layer through the through-holes;
an inorganic protective layer, which is disposed on a surface of the second electrolyte layer not facing the second electrode, and is configured to shield oxygen and water vapor; and
an organic protective layer disposed on a surface of the inorganic protective layer not facing the second electrolyte layer.

<2> The electrochromic device according to <1>, wherein a surface of the inorganic protective layer facing the organic protective layer includes at least an inorganic material.

<3> The electrochromic device according to <1> or <2>, wherein the organic protective layer includes an organic material.

<4> The electrochromic device according to any one of <1> to <3>, further including an antideterioration layer disposed on at least one of surfaces of the second electrode.

<5> The electrochromic device according to <4>, wherein the antideterioration layer contains at least one of conductive metal oxide particles and semiconductive metal oxide particles.

<6> The electrochromic device according to any one of <1> to <5>, wherein the electrochromic layer is formed by polymerizing a radical polymerizable compound having a triarylamine structure.

<7> The electrochromic device according to any one of <1> to <6>, wherein an electrolyte of the first electrolyte layer and an electrolyte of the second electrolyte layer each contain inorganic material particles.

<8> The electrochromic device according to any one of <1> to <7>, wherein the first electrolyte layer includes an insulating porous layer containing insulating metal oxide particles.

<9> The electrochromic device according to <8>, wherein the insulating metal oxide particles include SiO₂ particles.

<10> The electrochromic device according to <8> or <9>, wherein the insulating porous layer further includes an inorganic film.

<11> The electrochromic device according to any one of <1> to <10>, wherein diameters of the through-holes in the second electrode are 10 nm or greater but 100 μm or smaller.

<12> The electrochromic device according to any one of <1> to <11>, wherein a material of the first electrode is a conductive transparent material.

<13> The electrochromic device according to any one of <1> to <12>, wherein an average thickness of the electrochromic layer is 0.2 μm or greater but 5.0 μm or less.

<14> The electrochromic device according to any one of <1> to <13>, wherein the electrochromic layer has a structure where an organic electrochromic compound is born on at least one of conductive particles and semiconductive particles.

<15> The electrochromic device according to <14>, wherein the at least one of conductive particles and semiconductive particles is metal oxide.

<16> The electrochromic device according to <15>, wherein the metal oxide is titanium oxide.

<17> A method for producing an electrochromic device, the method including:
sequentially laminating a first electrode, an electrochromic layer, and an insulating porous layer on a support;

forming a second electrode, in which through-holes are formed, on the insulating porous layer to face the first electrode;
introducing an electrolyte solution into the insulating porous layer through the through-holes;
applying the electrolyte solution onto the second electrode;
solidifying the electrolyte solution;
forming an inorganic protective layer on the solidified electrolyte solution; and
forming an organic protective layer on the inorganic protective layer.

<18> A method for producing an electrochromic device, the method including:
sequentially laminating a first electrode and an insulating porous layer on a support;
forming a second electrode, in which through-holes are formed, on the insulating porous layer to face the first electrode;
introducing an electrolyte solution containing an electrochromic material into the insulating porous layer through the through-holes;
applying the electrolyte solution onto the second electrode;
solidifying the electrolyte solution;
forming an inorganic protective layer on the solidified electrolyte solution; and
forming an organic protective layer on the inorganic protective layer.

<19> A method for producing an electrochromic device, the method including:
sequentially laminating a first electrode, an electrochromic layer, an insulating porous layer, and an antideterioration layer on a support;
forming a second electrode, in which through-holes are formed, on the antideterioration layer to face the first electrode;
introducing an electrolyte solution into the insulating porous layer through the through-holes via the antideterioration layer;
applying the electrolyte solution onto the second electrode;
solidifying the electrolyte solution;
forming an inorganic protective layer on the solidified electrolyte solution; and
forming an organic protective layer on the inorganic protective layer.

<20> A method for producing an electrochromic device, the method including:
sequentially laminating a first electrode, an electrochromic layer, and an insulating porous layer on a support;
forming a second electrode, in which through-holes are formed, on the insulating porous layer to face the first electrode;
forming an antideterioration layer on the second electrode;
introducing an electrolyte solution into the insulating porous layer through the through-holes via the antideterioration layer;
applying the electrolyte solution onto the antideterioration layer;
solidifying the electrolyte solution;
forming an inorganic protective layer on the solidified electrolyte solution; and
forming an organic protective layer on the inorganic protective layer.

The electrochromic device according to any one of <1> to <16> and the method for producing an electrochromic device according to any one of <17> to <20> solve the aforementioned various problems in the art, and achieve the following object. Specifically, the object is to provide an electrochromic device, and a production method of the electrochromic device, which can be easily produced without a bonding process, can maintain oxygen shielding properties and water-vapor shielding properties with an element structure including only one support, and has improved durability.

What is claimed is:
1. An electrochromic device comprising:
a support;
a first electrode formed on the support;
a second electrode facing the first electrode, where through-holes are formed in the second electrode;
an electrochromic layer disposed in a space between the first electrode and the second electrode;
a first electrolyte layer disposed in the space between the first electrode and the second electrode;
a second electrolyte layer disposed to communicate with the first electrolyte layer through the through-holes;
an inorganic protective layer, which is disposed on a surface of the second electrolyte layer not facing the second electrode, and is configured to shield oxygen and water vapor; and
an organic protective layer disposed on a surface of the inorganic protective layer not facing the second electrolyte layer.

2. The electrochromic device according to claim 1, wherein a surface of the inorganic protective layer facing the organic protective layer comprises at least an inorganic material.

3. The electrochromic device according to claim 1, wherein the organic protective layer comprises an organic material.

4. The electrochromic device according to claim 1, further comprising an antideterioration layer disposed on at least one of surfaces of the second electrode.

5. The electrochromic device according to claim 4, wherein the antideterioration layer comprises at least one of conductive metal oxide particles and semiconductive metal oxide particles.

6. The electrochromic device according to claim 1, wherein the electrochromic layer is formed by polymerizing a radical polymerizable compound having a triarylamine structure.

7. The electrochromic device according to claim 1, wherein an electrolyte of the first electrolyte layer and an electrolyte of the second electrolyte layer each comprise inorganic material particles.

8. The electrochromic device according to claim 1, wherein the first electrolyte layer comprises an insulating porous layer containing insulating metal oxide particles.

9. The electrochromic device according to claim 1, wherein diameters of the through-holes in the second electrode are 10 nm or greater but 100 μm or smaller.

10. A method for producing an electrochromic device, the method comprising:
sequentially laminating a first electrode, an electrochromic layer, and an insulating porous layer on a support;
forming a second electrode, in which through-holes are formed, on the insulating porous layer to face the first electrode;
introducing an electrolyte solution into the insulating porous layer through the through-holes;

applying the electrolyte solution onto the second electrode;
solidifying the electrolyte solution;
forming an inorganic protective layer on the electrolyte solution solidified; and
forming an organic protective layer on the inorganic protective layer.

\* \* \* \* \*